United States Patent
Maston

(10) Patent No.: US 12,373,799 B2
(45) Date of Patent: *Jul. 29, 2025

(54) ROAD MAINTENANCE ANALYTICS

(71) Applicant: CVG Management Corporation, New Albany, OH (US)

(72) Inventor: Robert Maston, Columbus, OH (US)

(73) Assignee: CVG Management Corporation, New Albany, OH (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/212,788

(22) Filed: Jun. 22, 2023

(65) Prior Publication Data

US 2023/0334436 A1 Oct. 19, 2023

Related U.S. Application Data

(63) Continuation of application No. 16/421,101, filed on May 23, 2019, now Pat. No. 11,727,362.

(60) Provisional application No. 62/713,765, filed on Aug. 2, 2018.

(51) Int. Cl.
*G06Q 10/20* (2023.01)
*G06Q 10/0631* (2023.01)
*G08G 1/01* (2006.01)

(52) U.S. Cl.
CPC ....... *G06Q 10/20* (2013.01); *G06Q 10/06315* (2013.01); *G08G 1/0112* (2013.01)

(58) Field of Classification Search
None
See application file for complete search history.

(56) References Cited

U.S. PATENT DOCUMENTS

| | | | |
|---|---|---|---|
| 6,535,141 | B1 | 3/2003 | Doherty |
| 7,400,267 | B1 | 7/2008 | Doherty |
| 11,727,362 | B2 * | 8/2023 | Maston ............ G06Q 10/06315 705/7.25 |
| 2007/0005313 | A1 | 1/2007 | Sevastyanov |
| 2011/0298638 | A1 | 12/2011 | Groeneweg |
| 2012/0296683 | A1 | 11/2012 | Groeneweg |
| 2014/0062725 | A1 | 3/2014 | Maston |
| 2014/0067265 | A1 | 3/2014 | Maston |
| 2014/0094994 | A1 | 4/2014 | Menard |
| 2014/0122045 | A1 | 5/2014 | Mewes |
| 2015/0039361 | A1 | 2/2015 | Crowther |
| 2015/0106299 | A1 | 4/2015 | Rennie |
| 2015/0178572 | A1 | 6/2015 | Omer |
| 2015/0262485 | A1 | 9/2015 | Rennie |
| 2016/0275404 | A1 | 9/2016 | Abraham |
| 2018/0120561 | A1 | 5/2018 | Liu |
| 2019/0361149 | A1 | 11/2019 | Fajardo |

* cited by examiner

*Primary Examiner* — Cory W Eskridge
(74) *Attorney, Agent, or Firm* — McDonald Hopkins LLC

(57) ABSTRACT

Road maintenance activities are subject to data analytics. Data regarding a road can be received from a variety of sources including vehicle mounted sensors and network accessible services. A road treatment recommendation, such as plowing or treatment material distribution, can be automatically determined or inferred based on received data. The treatment recommendation can be conveyed to a service center or driver to facilitate road maintenance.

13 Claims, 11 Drawing Sheets

| Vehicle | | 207 Type: | | Truck | | Driver | John Doe | | | | | | | | | |
|---|---|---|---|---|---|---|---|---|---|---|---|---|---|---|---|---|
| | | | | | Treated Total | | | | | | Road Temp | | Avg. App. | | | |
| Date | Total (Miles) | Treated (Miles) | Plowed (Miles) | (Pounds) | Total Time (Hours) | #Right Turns | #Left Turns | Avg. | Snow Fall | Rate | Target Rate | Over Pounds | Cost/Ton | Overages $ |
| 2/8/2016 | 25.4 | 9.9 | 0 | 0 | 4.09 | 1.3 | 9 | 14 | 36 | 1.02 | 63.3 | 50 | 57 | $45 | $3 |
| 2/9/2016 | 131 | 66.2 | 17.3 | 29,475 | 7.3 | 127 | 126 | 28 | 1.3 | 225 | 75 | 58,950 | $45 | $1,326 |
| 2/10/2016 | 98.6 | 55.9 | 5.3 | 81,444 | 4.3 | 66 | 64 | 22 | 0.98 | 826 | 120 | 479,160 | $45 | $10,781 |
| 2/15/2016 | 96.2 | 68.3 | 26.3 | 63,781 | 4.3 | 57 | 61 | 30 | 0.51 | 663 | 50 | 781,550 | $45 | $17,594 |
| 2/16/2016 | 117.5 | 37.9 | 57.5 | 20,485 | 8.5 | 106 | 100 | 31 | 1.89 | 174 | 75 | 26,987 | $45 | $607 |
| 2/25/2016 | 183.5 | 79.4 | 76.4 | 26,259 | 7.4 | 125 | 94 | 33 | 1.3 | 152 | 50 | 52,779 | $45 | $1,323 |
| | | | | | | | | | | | | | | | $31,630 |

FIG. 4

ROAD MAINTENANCE ANALYTICS

CROSS REFERENCE TO RELATED APPLICATIONS

This application claims the benefit of U.S. Provisional Application No. 62/713,765, filed Aug. 2, 2018, and entitled "METHOD FOR AUTOMATING ROAD CONDITION MEASUREMENT, ANALYSIS AND TREATMENT," the entirety of which is incorporated herein by reference.

BACKGROUND

Maintaining roads and highway systems is important to ensure safe transportation of people as well as cargo. During cold weather, snow and ice can accumulate and affect vehicle traction in dangerous ways. Flooding, fallen trees, landslides and other natural phenomenon have the ability to block roadways and impede safe travel. Even serviceability of a road surface, such as one that is seriously degraded with holes, can place drivers in peril. Cities and municipalities maintain service departments and fleets of vehicles and equipment to cure or mitigate conditions detrimental to safe travel. For instance, roads are cleared of debris, plowed and treated with a deicer, as well as repaired or replaced.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to road maintenance analytics. Data can be received from a variety of sources including one or more vehicle mounted sensors, network-accessible services and equipment operators. Road condition can be determined or inferred based on a least a subset of the data, such as road temperature, among others. A treatment recommendation can be determined or inferred based on the road condition and a myriad of other factors such as weather conditions, residual treatment material remaining on roads, as well as staff, material, and equipment availability, among other things. For example, a treatment recommendation can be to plow a snow covered road or apply a particular treatment material such as a deicer. The collected data as well as the treatment recommendation can be rendered graphically as a report or graphical user interface. In one instance, data can be overlaid on a map. Additionally, or alternatively, a control signal can be issued to a controller to trigger automatic implementation of the treatment recommendation by service equipment.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

FIG. 4 is a table depicting an exemplary report capturing road and service data.

DETAILED DESCRIPTION

Maintenance of roads is important to ensure the safety of people as well as property. However, weather and the impact of weather on roadways are difficult to foresee. Furthermore, microclimates exist that present different challenges within particular areas. Data associated with roadways can be collected and analytics applied to discover, interpret, communicate, and exploit meaningful patterns. More concretely, data can be analyzed and utilized to optimize use of resources in maintaining roads.

In one instance, data can be utilized to determine or predict current road condition and recommend treatment options based on the road condition and any number of other factors. Data can be acquired from substantially any source. In one embodiment, however, at least a subset of data can be acquired from vehicle or service equipment mounted sensors. For example, plow trucks can have sensors mounted to detect air and road surface temperatures. The data can then be utilized to determine what treatment to employ (e.g., plow, salt . . . ) as well as where, when, and how the treatment will be performed. Treatment recommendations together with current road conditions can be rendered on a map and made available to service managers or others. Further, the treatment recommendations or portions thereof can be pushed directly to service trucks to control treatment and route, for instance.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
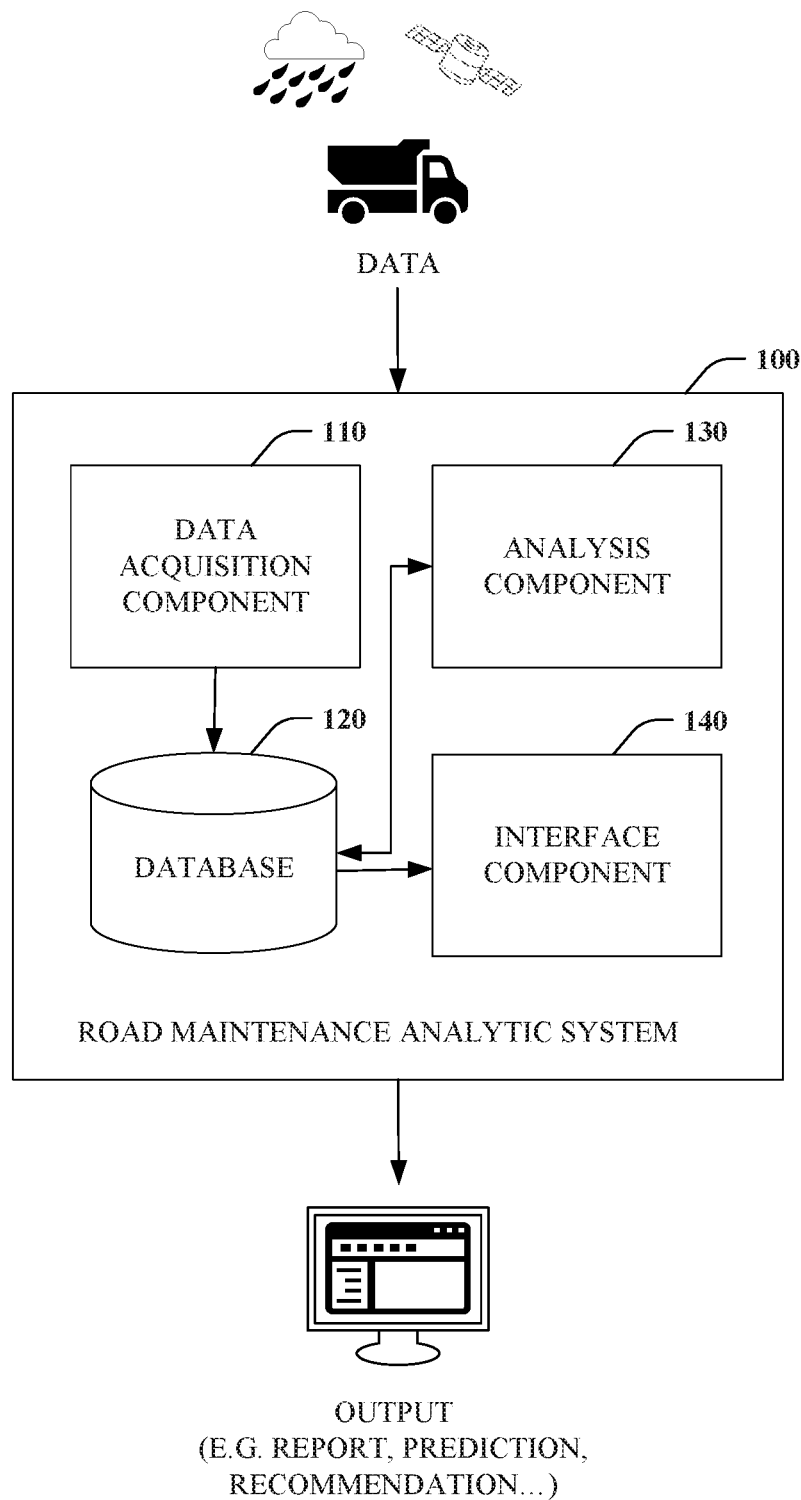
FIG. 1 is a schematic block diagram of a road maintenance analytics system.

Referring initially to FIG. 1, a road-maintenance analytics system 100 is illustrated. The system 100 is configured to receive data from a variety of sources and generate an output such as a report, prediction, or recommendation. In one instance, the output can be rendered as a visualization, such as part of a dashboard or other graphical interface. Additionally or alternatively, the output can be a control signal, for example, to control distribution of a treatment material (e.g., salt, deicer . . . ). The system 100 comprises data acquisition component 110, database 120, analysis component 130, and interface component 140.

The data acquisition component 110 is configured to, or provides a means for, acquiring data from a variety of data sources. In one instance, data can be received from collection mechanisms, or sensors, mounted on vehicles, such as service trucks. The sensors can measure speed, location, directional heading, treatment material amount and distribution rate, surface temperature, surface friction, snow or ice coverage, and residual treatment material, among other things. Data can be acquired from other sources including from cloud-based services. For example, weather data including past, present, and future forecasts can be received from such a service. Further, human input regarding road condition can also be acquired. For instance, a driver of a service truck could note that a particular section of road is covered with black ice. Such human input can be received by way of substantially any interface (e.g., text, graphical, voice) and gesture. Additional data could also be acquired regarding a particular road including surface material (e.g., asphalt, concrete, stone . . . ), number of lanes, length, and grade/slope, among other things. Other data can be acquired including accident reports, high traffic areas, historically dangerous roads, available service staff and vehicles, available treatment materials, and driver information (e.g., hours of operation past and current, alertness status, miles in route, route repeat time . . . ).

The data acquisition component 110 can store acquired data in the database 120 for subsequent access and processing. The database 120 corresponds to a non-volatile data store capable of storing a collection of data so that data can be easily accessed, managed, and updated from a computing device. The database 120 can also correspond to a database management system (DBMS) that interacts with users, applications, and the database itself for creating and managing databases. In accordance with one embodiment, the database 120 can enable data streaming to enable real time or substantially real time processing and insight.

The analysis component 130 is configured to, or provides a means for, analyzing the data received by the data acquisition component 110 and managed by the database 120. The analysis component 130 is a mechanism for interpreting or extracting meaning from collected data. In accordance with one embodiment, the analysis component can cleanse, transform, and organize data to facilitate subsequent data visualization. In this manner, acquired data is organized in a manner that is easily comprehendible by human user. In one particular, embodiment the data can be utilized to populate a report. However, more complex analysis can be employed to generate predictions and recommendations. For instance, predictions and recommendations can be generated related to whom, when, or how a road is maintained. By way of example, and not limitation, a recommendation can identify roads that require treatment, a specific treatment to be applied to each road and a route for one or more surface trucks to apply the treatment.

Figure 2:
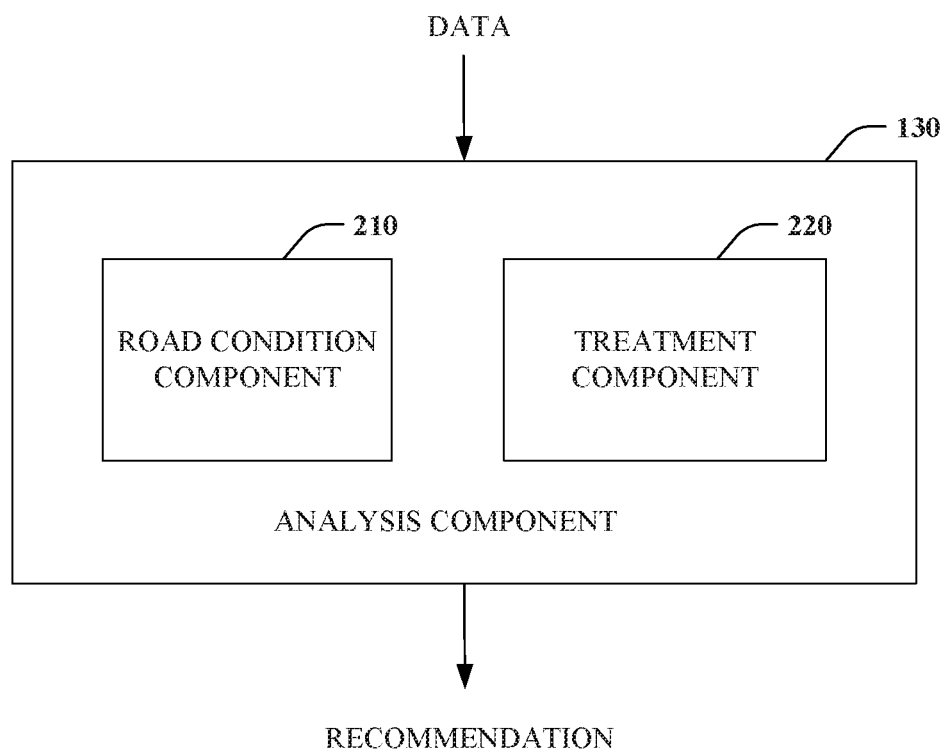
FIG. 2 is a schematic block diagram of a sample analysis component.

Turning attention to FIG. 2, a sample analysis component 130 is illustrated. The analysis component 130 receives data, for example from the database 120, and outputs a prediction or recommendation. The analysis component 130 comprises road condition component 210 and treatment component 220.

The road condition component 210 is configured to determine or infer the condition of a road from data. In one instance, the condition of the road can relate to treatable issues. For example, condition of the road can include the temperature of the road, whether or not the road is snow or ice covered, and level of residual treatment material. The condition of the road can also relate to the presence or absence of potholes or presence of debris, among other things. Some conditions can be determined directly by sensors. As examples, road surface temperature can be determined by a sensor on or in a road or an infrared sensor directed to the ground from a vehicle or other equipment. As another example, residual treatment material can be measured directly by a sensor configured to detect and determine a level of residual material on a roadway, for instance based on image analysis or spectrometry. The same or different conditions can be derived or inferred from sensor output. For example, road temperature can be derived based on air temperature in the surrounding area over time and thermal properties of the road material. As another example, residual treatment material can be inferred based on an amount of material applied, time of application, road grade, traffic, weather, and properties of the material. In accordance with one embodiment, the road condition component 210 can output a number of values associated with condition of a road (e.g., temperature, coverage, residual treatment . . . ). Alternatively, the road condition component 210 can synthesize a number of values into a single road condition score.

The treatment component 220 is configured to determine or infer treatment of a road surface. Treatment can comprise plowing and applying a material, such as a deicer, among other things. The treatment component 220 is operable to determine or infer a treatment to recommend based on a number of factors including the road condition as determined or inferred by the road condition component 210. As a simple example, if the road condition indicates a street is covered with snow, the treatment component 220 can recommend plowing the street. Similarly, if the road conditions indicate the presence, or likely presence, of ice, the treatment component 220 can recommend application of a particular deicer. However, the treatment component 220 can consider more than current road condition. For instance, the treatment component 220 can consider many other factors including but not limited to past, present, and future weather, availability of treatment material, availability of staff and equipment, season forecast, treatment costs, as well as driver hours of operation, health, and alertness status, among other things. As such, the treatment component 220 is capable of solving a nontrivial multi-criteria optimization problem, for instance identifying a Pareto optimal solution. In one embodiment, the treatment component 220 can employ statistical analysis or artificial intelligence mechanisms to compute an optimal treatment given tradeoffs associated with various factors. Furthermore, recommendations can extend beyond a kind of treatment to include, for example, specifics of a treatment (e.g., material (e.g., sodium chloride, calcium chloride . . . ), distribution rate . . . ) and an optimal route for one or more service trucks.

Figure 3:
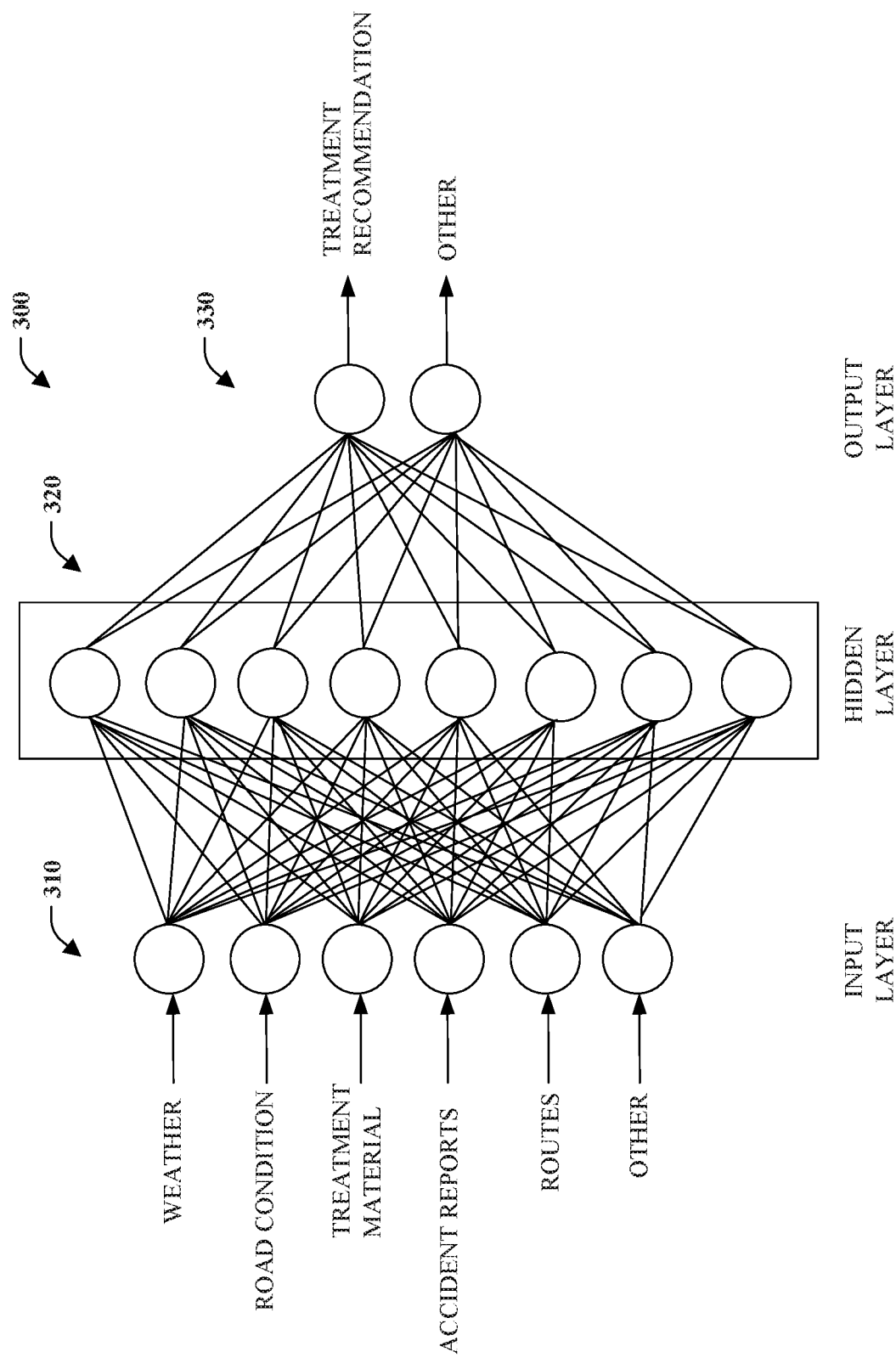
FIG. 3 illustrates an artificial neural network associated with road maintenance analytics.

Turning attention to FIG. 3, an artificial neural network 300 is depicted. The artificial neural network 300 includes a number of artificial neurons represented by circles and connections between the artificial neurons. Each artificial neuron is represented by a value that represents all inputs to the neuron. There are three groups of artificial neurons, input layer 310, hidden layer 320, and output layer 330. The input layer comprises artificial input neurons that bring initial data into the system and pass the data to the hidden layer 320. As shown, the input layer 310 can receive data corresponding to a weather, road condition, treatment material, accident reports, and routes, among other things. The hidden layer 320 is the portion of the artificial neural network 300 that is capable of learning. The hidden layer 320 nodes perform computations and transfer information from input to output nodes. Nodes that comprise the output layer 330 are responsible for computations and transferring information from the neural network 300 to the outside world. Here, the output layer 330 comprises a node that identifies a treatment recommendation or other information such as a route, or treatment distribution level. The neural network 300 can learn to identify an optimal treatment for a road by way of supervised learning, unsupervised learning or reinforcement learning in conjunction with forward and backward propagation. Once trained the artificial neural network 300 can be utilized to perform multi-factor optimization related to road maintenance including suggesting or recommending a treatment. The artificial neural network 300 or additionally linked networks can also be employed to further refine recommendations, for example to include material types and distribution rates as well as an optimal route for one or more trucks to follow given their current locations.

It should be appreciated that the artificial neural network or other machine learning mechanism can employ continuous learning. In one embodiment, data can be gathered, some underlying structure is learned through training data, and the system is employed to apply what it has learned to solve a problem such as finding an optimal treatment for a road. In this case, the quality of the machine learning mechanism is dependent on the quantity and quality of training data. Continuous learning can also be employed to monitor performance, retrain, and redeploy to ensure a quality recommendation. In one instance, continuous machine learning can be employed with respect to determining a treatment recommendation based on comparison of post treatment results to expected results. In other words, effectiveness of a recommended treatment can be captured and utilized to improve a machine learning mechanism associated recommending treatments. For instance, if a treatment is deployed on a road and the road remains dangerous, for example due to ice, as determined by sensors, human input, or accident reports, perhaps the wrong type of treatment was employed. Accordingly, a different type of treatment can continue to be employed until ice is eliminated from the road. The system can learn through this the appropriate treatment for use in future treatments. However, the learning need not be specific to a particular road. For example, the system could learn that below fifteen degrees Fahrenheit sodium chloride is not effective and that calcium chloride should be used.

Briefly referring back to FIG. 1, the interface component 140 can present data and derived information for subsequent use. In accordance with one embodiment, the interface component 140 can produce a summary of data or key metrics in a report. In one instance, the report can be a table of data such as table 400 depicted in FIG. 4. The table 400 identifies an associated vehicle, type, and driver to which the report pertains. Further, the table 400 identifies a number of exemplary columns of data associated with particular dates including total miles, treated miles, plowed miles, total treatment in pounds, total time, number of right turns, number of left turns, road average temperature, snow fall, average application rate, target rate, overage in treatment material, treatment cost, and overage in dollars. The table 400 could also be color coded. For example, green can indicate treatment is within a target range, blue can denote under treatment, and red can represent over treatment. Data provided in the table 400 can facilitate post event processing or evaluation. For example, after the winter season, treatment costs can be compared to forecasts, accident and damage claims reviewed for potential future changes, driver scoring can be employed to determine whether future training is merited. Such information can also be utilized by background processes in a feedback loop to further improve real time or near real time recommendations by the system 100.

In another embodiment, an interactive dashboard or other graphical user interface can be rendered by the interface component 130. Similar data to that provided in a report can be presented in graphical user interface enabling customized views and drill down and rollup of data. In one particular implementation, data can be overlaid on a map. For instance, road temperature can be indicated by coloring a road a particular color. Likewise, roads that have been plowed can be indicated on the map. In another embodiment, the interface component 140 can support presenting data in virtual or augmented reality. In this manner, a service manager or other user can interact with data in three dimensions. In a particular embodiment data can be projected on a service truck windshield indicating a route to service and data regarding the route such as depth of snow, road temperature, residual treatment material, as well as one or more treatment recommendations.

Figure 5:
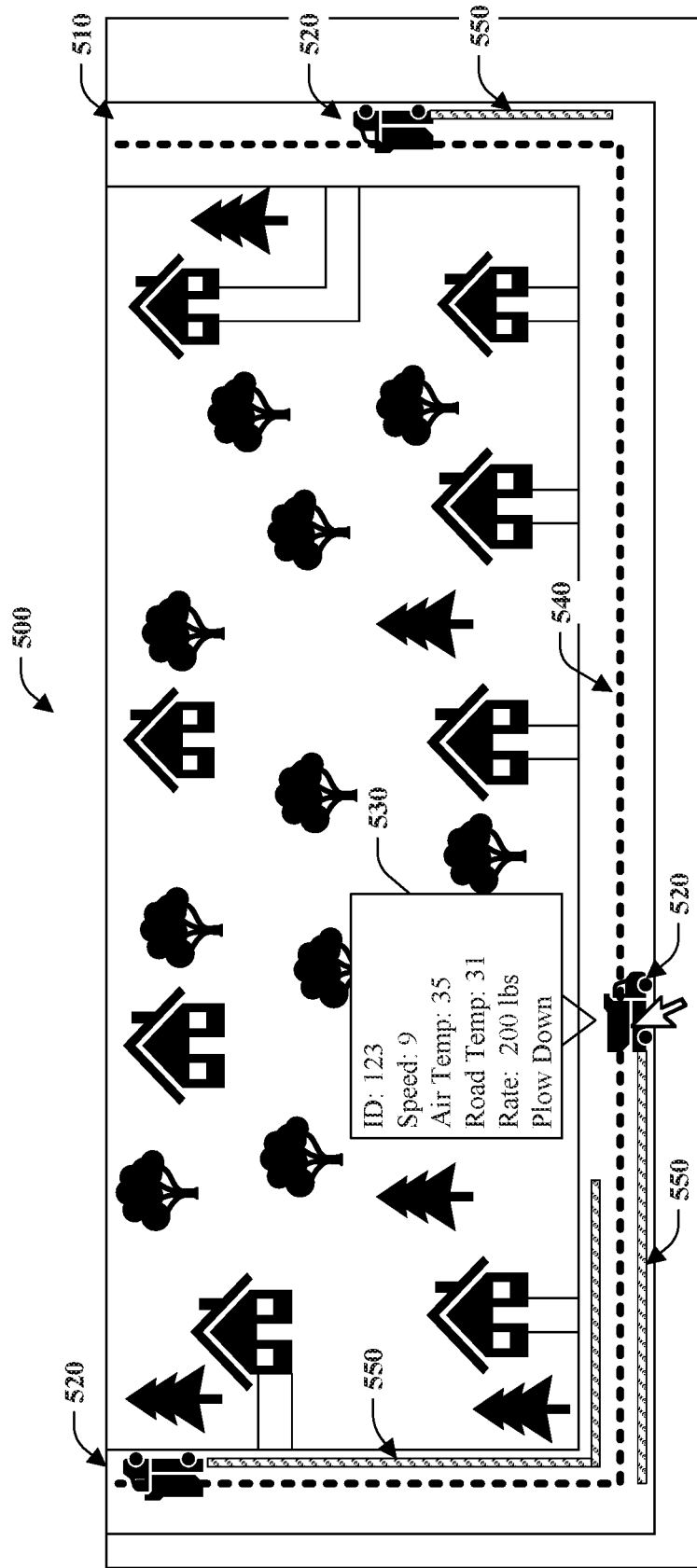
FIG. 5 is a screenshot of a representative interface for display of road data.

Referring to FIG. 5, a screenshot 500 of a representative interface is illustrated. The screenshot 500 depicts a map with road data overlaid on the map. At 510, a road subject to treatment is depicted. At 520, a graphical representation of a service truck as well as location and directional heading of a service truck is indicated on the road. In this screenshot, three service trucks are shown, one traveling east and two traveling north. Upon selecting or hovering over a graphical representation of a truck, additional information can be provided at 530. Such information can include a service truck identifier, speed, air temperature, road temperature, rate of treatment distribution, and status of a plow (e.g., up or down), among other things. At 540, road temperature is indicated graphically. Here, there is a dashed line indicative of a particular temperature or range of temperatures, wherein other types of dashed lines denote distinct temperatures or temperature ranges. In another embodiment, the road temperature or range of temperatures can be indicated by various line colors or shadings of a road on the map. At 550, a treated portion of the road is graphically distinguished from untreated portions of the road. The screenshot 500 indicates treatment with rectangular box with diagonal line fill and non-treatment by the absence of any such graphic. Of course, varying colored boxes or lines could also be utilized, among other things, for the same effect. Further, treatment can correspond to a single action or multiple actions, such as plowed or treated portions of a road or plowed and treated portions of the road, for example. Further, although not specifically illustrated, the screenshot 500 can include a graphical representation of one or more recommendations or suggestions regarding treatment overlaid on the map or presented separately such as in a window separate from the map.

In yet another embodiment, the interface component 140 can be a voice interface. For instance, periodically or on demand, a voice interface can be employed to communicate data or information. Voice announcements can be provided at scheduled times or be event driven. For example, a detected condition change could prompt the following announcement: "Due to measured and predicted surface temperatures dropping below fifteen degrees Fahrenheit, stop using sodium chloride (NaCl) and begin deployment of calcium chloride (CaCl) since NaCl is not effective at these temperatures. Do not plow in an area when snow depth is under two inches as salt has been deployed here less than one hour ago. Do not use liquids on overpasses until surface and air temperatures are above twenty degrees. All overpasses should be re-plowed and re-salted each pass." Further, the voice interface can also receive input regarding road conditions as well as respond to human voice commands or queries). For example, a driver may note that a section of road is covered in black ice by way of spoken word received by a digital voice assistant or other mechanism.

Figure 6:
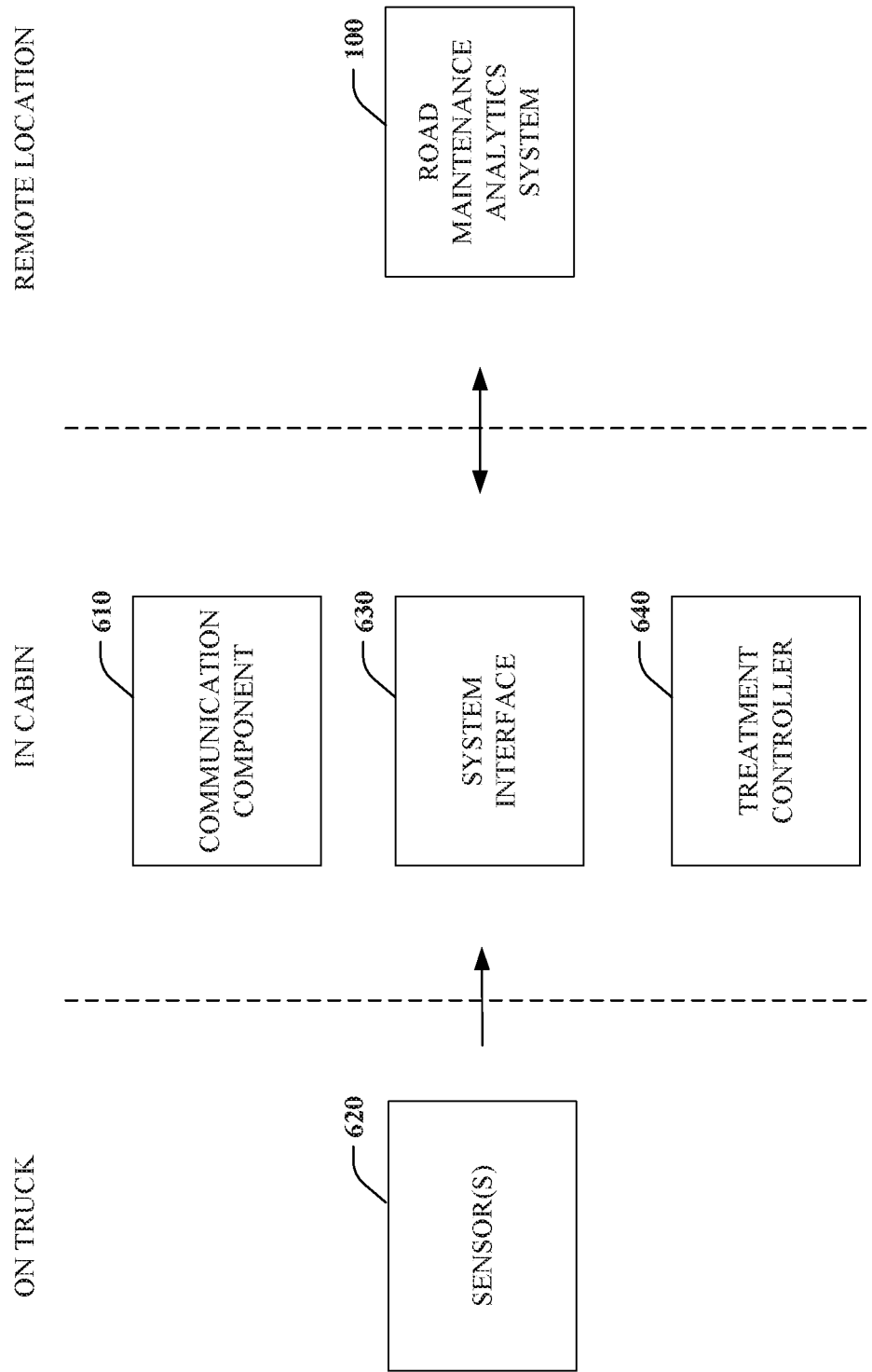
FIG. 6 is a swim lane diagram illustrating road maintenance functionality with respect to a service truck.

FIG. 6 is a swim lane diagram illustrating road maintenance functionality associated with a service truck. There are three locations indicated, namely on truck, in cabin, and remote location. The on-truck location corresponds to anything attached to a truck outside a cabin. The in-cabin location concerns a cabin or cab space where the driver is seated. The remote location can be any location outside, and not attached to, the truck and cabin. For example, a remote location can be a physical service center or network accessible location. Communication component 610 resides inside the cabin of a service truck, such as a plow truck, and is configured to receive and transmit communications in a variety of ways over a wired or wireless communication link.

The communication component 610 can receive data from one or more sensors 620 that reside on the exterior of the truck by way of wired or wireless communication. The one or more sensors 620 can include sensors that measure truck data including location, directional heading, speed, distance traveled, and treatment applied. Weather conditions can also be measured by the one or more sensors 620 including road temperature, air temperature, snow coverage, ice coverage, and residual treatment material.

Although not illustrated, it should be appreciated that the communication component 610 can also receive data from sensors inside the cabin as opposed to outside on the truck. Such sensors could collect data regarding a driver such as driver alertness, or distraction, among other things.

The communication component 610 can also enable communication between a remotely located road maintenance analytics system 100 and a corresponding system interface 630 residing in a truck cabin. In one instance, the road maintenance analytics system 100 can receive data from the sensors by way of the system interface 630 and the communication component 610. In another instance, the road maintenance analytics system 100 can analyze data and return a recommendation with respect to treatment or route among other things. In accordance with one embodiment, the road maintenance analytics system 100 can be exposed as a network-accessible, or cloud-based, service, and the system interface 630 can correspond to a browser or other mechanism capable of interacting with the service.

The system interface 630 can expose insight provided by the road maintenance analytics system 100 to a driver and truck in various ways. In one instance, the system interface 630 can present data, information, or recommendations to a driver, for example by way of display on a display device within the cabin (e.g., display screen, windshield projection . . . ) or driver device (e.g., tablet, laptop, phone, augmented reality glasses . . . ). Based on the received information or recommendations, the truck driver can then trigger treatment controller 640 to perform some action such as lower or raise a plow or engage or disengage a spreader to distribute a treatment material. Additionally, or alternatively, the system interface 630 can communicate directly with the treatment controller 640 and issue a control signal to perform a treatment action as recommended by the road maintenance analytics system 100. For example, the treatment controller 640 can be triggered to engage a spreader to distribute treatment material, such as a deicer, when the truck is located on a particular road or portions thereof recommended for treatment by the road maintenance analytics system 100. Of course, a mechanism can also be provided to allow the driver to override automatic control of treatment actions by the treatment controller 640 for safety or other reasons.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for the sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter aha, can automate certain mechanisms or processes performed thereby to make portions of the systems and methods more adaptive as well as efficient and intelligent. By way of example, and not limitation, such mechanisms can be utilized by the analysis component 130 to infer road conditions and optimal treatment options given the road conditions and other factors.

In view of the exemplary systems described above, methods that may be implemented in accordance with the disclosed subject matter will be better appreciated with reference to flow chart diagrams of FIGS. 7-10. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 7:
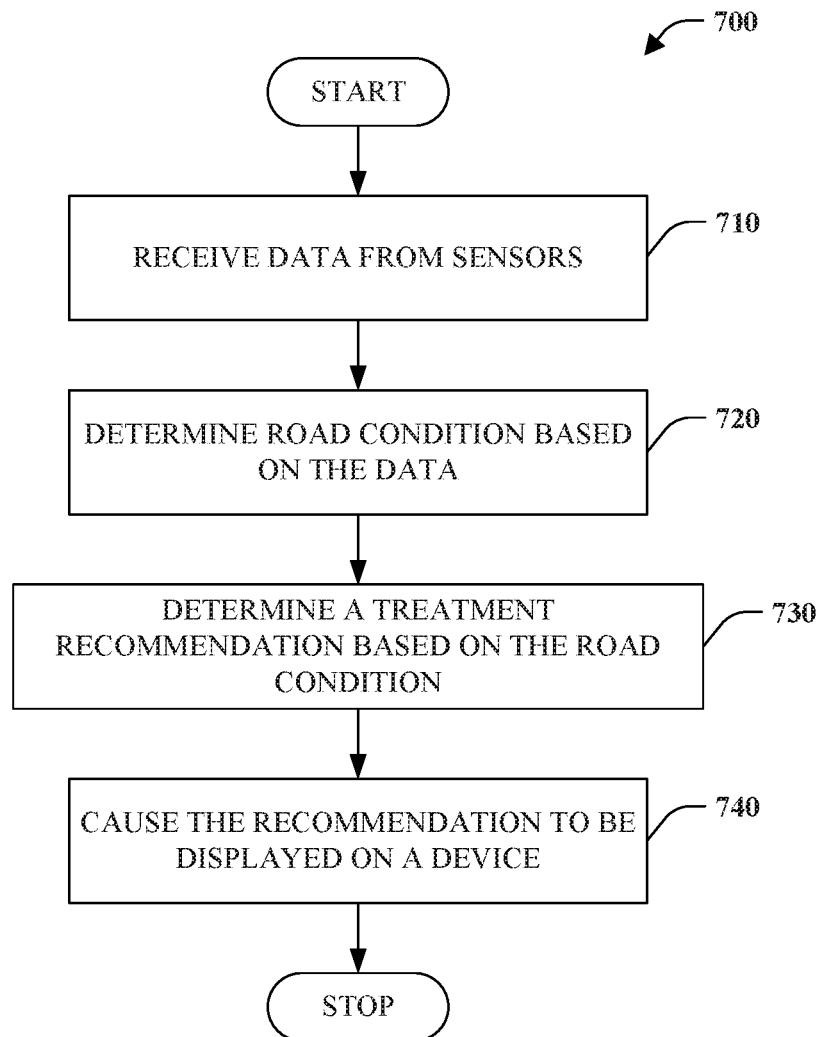
FIG. 7 is a flow chart diagram of method of road maintenance data analysis.

FIG. 7 illustrates a method 700 of road maintenance data analysis. The method 700 can be performed by the road maintenance analytics system 100 and components thereof. At reference numeral 710, data from one or more sensors is received, for example by the data acquisition component 110. Sensor data can be acquired from substantially any source that would useful with respect to road maintenance. In one instance, data can be acquired from one or more vehicle mounted sensors. For example, data can be acquired from sensors that measure air temperature, road temperature, or residual treatment material from one or more vehicles traveling roadways including commercial vehicles and road maintenance vehicles. Additionally, or alternatively, sensor data can be acquired from a network-based, or cloud, service. For instance, past, present, and future forecasted weather can be acquired from a cloud service. Still further yet, data can be received from an equipment operator. For example, a plow truck operator can notice a section of road includes black ice and provide this data.

At 720, a condition of a particular road is determined, for example by road condition component 210. At least a subset of data collected can be related to the surface condition of a road. From this data, the road can be classified to be in one of a number of surface conditions ranging, for instance, from safe to dangerous. By way of example, sensor data indicating that a road surface temperature is well below freezing in conjunction with detected precipitation can be indicative of an icy and thus dangerous roadway. Similarly, detection by one or more sensors of snow on a roadway can also be indicative of a dangerous condition. By contrast, sensor data that indicates that a road surface temperature is well above freezing with no recent precipitation can be indicative of a safe condition. While the road condition can be classified in one or more groups or classes, the road condition can alternatively correspond to various collected or derived data associated with road condition such as road temperature and presence or absence of snow or ice.

At 730, a treatment recommendation is determined based on the road condition, for example by treatment component 220. For instance, if the road condition is snow covered, the recommended treatment can be to plow the road. If the road condition is icy, the recommended treatment can be to apply deicer as the treatment material. These are very simplistic examples. Treatment can be recommended based on many more factors than the current road condition. Other factors can include, but are not limited to, past, present, and future weather, material, staff and equipment availability, presence of residual treatment material, road grade/slope, route priority (e.g., high traffic areas, critical zones, historically dangerous roads . . . ), service driver information including hours of operations, health, and alertness status, and season forecast, among other things. Further, specific treatments can have further factors such as type of treatment to apply to a surface (e.g., salts, liquids, binding agents . . . ) and application rates. Data can also change in substantially real time adding further difficulty to determining a treatment recommendation given various factors of different levels of importance. In one embodiment, a Pareto optimal solution can be computed such that it is not possible to reallocate to make any one factor better without making at least one other factor worse off. Statistical analysis or artificial intelligence mechanisms can be employed to determine the optimal recommendation with respect to this non-trivial problem. Further, a treatment recommendation can be refined, for example to also include an optimal route for one or more service trucks to follow given current locations to efficiently effect the treatment.

At 740, a treatment recommendation is caused to be displayed on a device, for example by the interface component 140. A graphical representation of the treatment recommendation can be generated and conveyed for rendering by a device. In accordance with one aspect, the treatment representation can be presented as part of a dashboard or user interface. In one instance, the treatment recommendation can be overlaid on a map, which can graphically represent road conditions. However, there are other ways in which the treatment recommendation can be communicated, for example, by voice, text message, voice mail or social media, among others. In accordance with one embodiment, the recommendation can be provided by a chatbot as an unprompted announcement or in response to a query.

Figure 8:
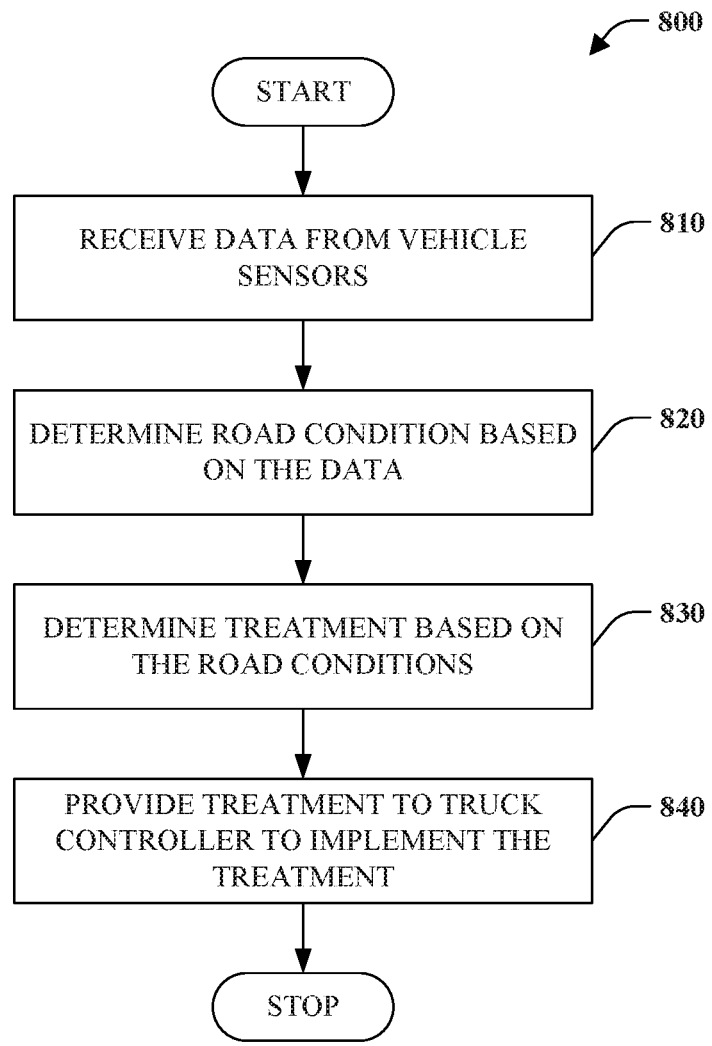
FIG. 8 is a flow chart diagram of a method of analyzing road maintenance data.

FIG. 8 is a flow chart diagram of a method 800 of road maintenance data analysis. The method 800 can be performed by the road maintenance analytics system 100 of FIG. 1 or various components thereof. At 810, data from vehicle sensors is received. In accordance with one disclosed aspect, service trucks can be outfitted with one more sensors to detect conditions related to road surfaces and microclimates. However, the sensors need not be isolated to service trucks. In fact, according on one particular aspect sensors can be provided for substantially any vehicle including commercial trucks. The sensors could be utilized collect data and inform a driver about whether or not roads are safe. The collected data by these sensors can be aggregated and stored for subsequent employment optionally in substantially real time.

At 820, road condition can be determined based the data received from the vehicle sensors and optionally other sensors or services. In accordance with one embodiment, the road can be classified into one or more predetermined groups or classes. For example, a determination can be made that a roadway is icy based on one or more vehicle sensors reporting below freezing surfaces. Additionally, or alternatively, a determination can be made that a roadway is snow covered based on one or more vehicle sensors that can detect the presence of snow. In an alternate embodiment, the road condition can be defined as a collection of road specific data.

At 830, a treatment is determined based on an identified road condition or data associated with road condition as well as other factors. As examples, treatment for a snow-covered road can be to plow the road, and treatment for an icy road can be to apply a deicer to the surface. Other factors for consideration can include past, present, and future weather, material, staff, and equipment availability, presence of residual treatment material, road grade/slope, route priority (e.g., high traffic areas, critical zones, historically dangerous roads . . . ), service driver information including hours of operations, health, and alertness status, and season forecast, among other things. Further, specific treatments can have further factors such as type of treatment to apply to a surface (e.g., salts, liquids, binding agents . . . ) and application rates.

At numeral 840, the determined treatment can be communicated to a service truck. More specifically, a control signal can be communicated to a controller to implement the treatment. By way of example, salt can be distributed at a particular rate from a plow truck automatically when the truck is located on the road designated for the treatment. In accordance with one aspect, a driver can override the automatic treatment, for example for safety or other reasons.

Figure 9:
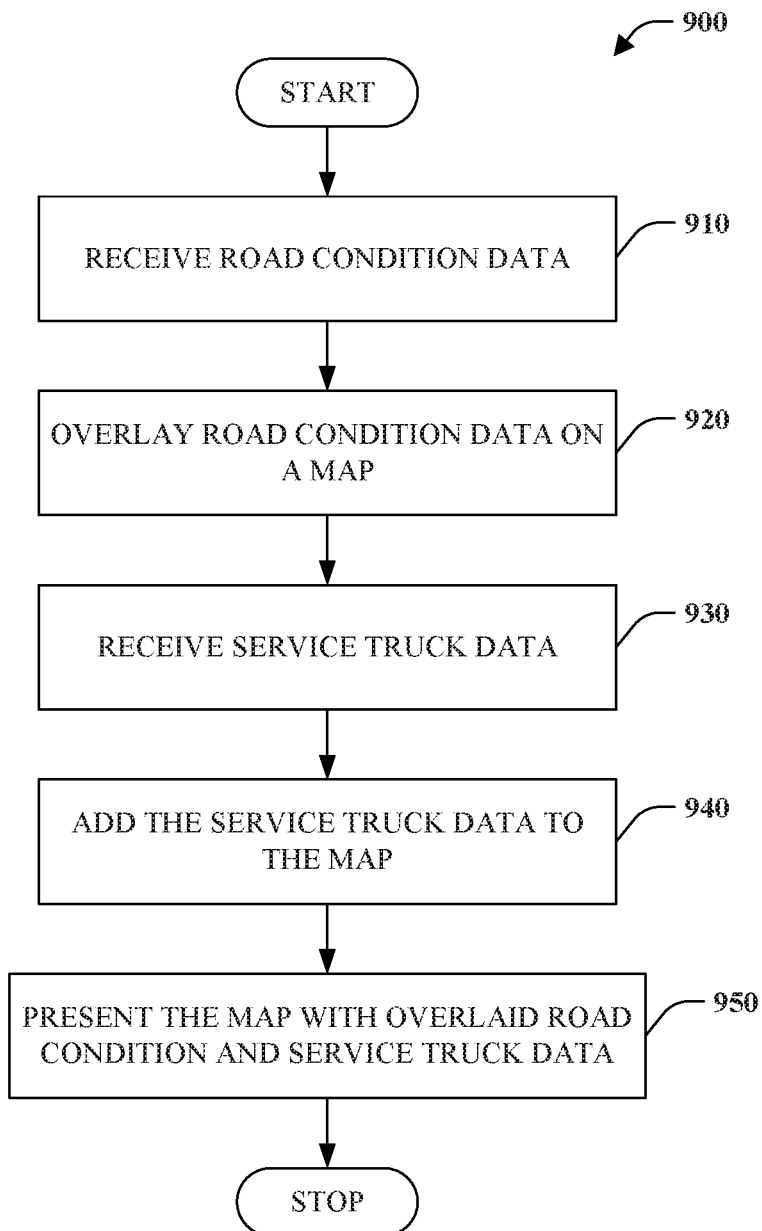
FIG. 9 is a flow chart diagram of method of data presentation.

FIG. 9 is a flow chart diagram of a method 900 of presenting data, which can be implemented by interface component 140 of FIG. 1. At reference numeral 910, road condition data is received. Road condition data from a variety of sources can be acquired and stored, and later retrieved, for example from a database. At 920, the road condition data is overlaid on a map. A map can be acquired, and road condition data added to the map in various ways. For instance, a colored line can be added to a street to indicate the surface temperature of the road. As another, example, snowflakes could be added to a road to indicate accumulated snowfall on the road. At 930, service truck data is received. The service truck data can include the location, directional heading, speed, and information regarding applied treatments such as an indication that the plow is down, and salt is being applied at a particular rate. At numeral 940, the service truck data is added to the map. For example, an image of a truck heading a particular direction on a road can be representative of the service truck. Additional data could be presented upon selection or hovering over a particular truck. At numeral 950, the map with road condition and service truck data layered on top is conveyed for display on a display device. For example, the visualization can be presented on a computer monitor, a smart phone, a tablet or augmented reality glasses or the like. Furthermore, data can be presented audibly alone or in connection with visualization.

In accordance with one embodiment, the presented data can expose or facilitate identification of patterns. By way of example, scenarios can be explored by layering of data. For instance, a poor road conditions can be presented on a map and subsequently particular driver routes added. From this information, one may be able to infer that the poor road conditions are associated with a particular driver, and thus additional training may be appropriate.

Figure 10:
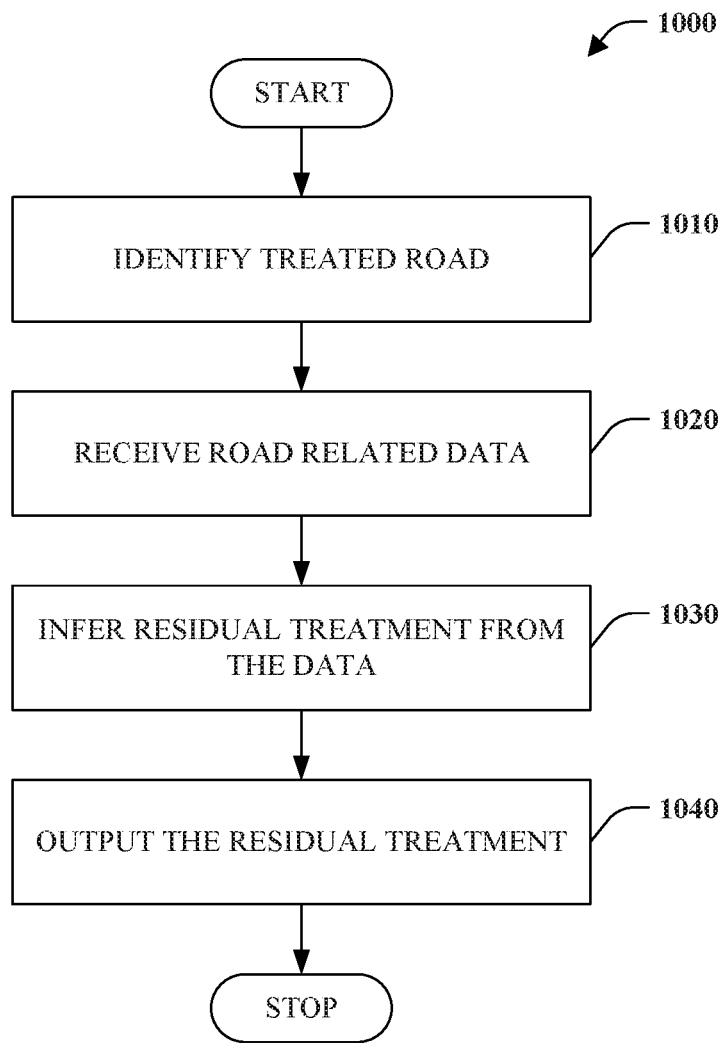
FIG. 10 is a flow chart diagram of method of determining residual treatment.

FIG. 10 is a flow chart diagram of a method of determining residual treatment material, which can be performed by the analysis component 130 or by a sensor. At numeral 1010, a treated road is identified. In accordance with one embodiment, a treated road can be identified based on data indicating the road was treated in the recent past. At reference 1020, road related data is received. The road related data can include data regarding type of surface, surface temperature, air temperature, road grade or slope, type, and quantity of treatment material distributed, traffic, and weather, among other things. At 1030, the residual treatment remaining is inferred based on the received data regarding the road. By receiving the initial quantity and type of treatment material distributed on the road and considering factors that reduce treatment material longevity, such as time since distribution, road grade, weather and traffic, the amount of remaining treatment material, or residual treatment, can be computed. For example, if salt was applied to a road with a steep grade and heavy traffic, a few days ago, during which time there was heavy rain, the analysis component 130, or other mechanism, can infer that there is very little if any residual treatment remaining. By contrast, consider a situation in which salt was distributed heavily a few hours ago, on a substantially flat grade road, where the salt has not been plowed off, and there is no additional precipitation. In this case, the analysis component 130, or other mechanism, can infer that a large percentage of treatment material remains on the road. At 1040, the inferred residual treatment is output. In one instance, the residual treatment can be displayed as a percentage or other quantity associated with the amount or level of treatment material remaining on a road. In another instance, the residual treatment can be input considered when recommending a treatment.

Chatbots can exploit aspects of the subject disclosure. Chatbots are computer-implemented mechanisms that enable conversation by way of auditory or textual methods. Chatbots can utilize sophisticated natural language processing to mimic human conversation in responding to requests or performing tasks. A chatbot can be employed in a cab of a plow driver as a type of digital assistant associated with road maintenance. Auditory chatbots can be particular useful for plow drivers. In one scenario, a chatbot can communicate a treatment recommendation automatically or in response to a request. Further, a query regarding the treatment can be received and a response proved without further human intervention. For instance, a plow driver may ask why a particular treatment is recommended, and a response provided based on the factors involved in making the recommendation.

Aspects of the subject disclosure pertain to the problem of maintaining road safety. In one particular instance, winter, snow and ice may need to be addressed by way of various treatment options. However, rapidly changing microclimates and limited resources make it extremely difficult, if not impossible, to manage treatment properly across many roads. To address this problem, road maintenance analytics are employed to determine or infer proper treatment in light of a myriad of factors as well as an efficient means for applying the treatment.

The subject disclosure focuses on winter road maintenance associated with snow and ice. However, the disclosure is not so limited. In fact, the same or similar analytics can be employed with respect to other maintenance tasks including filling holes and painting street lines. For example, a service truck or other vehicles can be outfitted with a sensor that detects potholes based on surface level differences. Such information can be provided to a service center and utilized to optimize street repair.

The subject disclosure various products and processes that perform, or are configured to perform, various actions regarding road maintenance analytics. What follows are one or more exemplary systems and methods.

A system comprises a processor coupled to a memory that includes instructions that when executed by the processor cause the processor determine a road condition based on data from one or more sensors, services, or driver inputs, determine a treatment recommendation for a road based on the road condition and available treatment options, and output the treatment recommendation. The system further comprises instructions that cause the processor to determine the treatment recommendation based on residual treatment remaining on the road. The residual treatment remaining on the road can be computed based on the type of treatment, time of treatment, weather, and traffic. The treatment recommendation can be to plow a road or apply a treatment material. Further, the treatment recommendation can include a recommended route. At least one of the one or more sensors is a vehicle mounted sensor that detects road surface temperature. The system can further comprise instructions that cause the processor to convey, for display for display on the display device, road condition data overlaid on a map. The system of, further comprises instructions that cause the processor to trigger performance by service equipment of the treatment recommendation, wherein in one instance distribution of a treatment material is triggered in accordance with the recommendation. Further, in one instance, the treatment recommendation can be determined automatically by an artificial neural network. The system can further comprise instructions that cause the processor to receive driver input and output the treatment recommendation by way of a voice user interface.

A method comprises executing, on a processor, instructions that cause the processor to perform the following operations: determining a road condition based on data from one or more sensors, services, or driver inputs, wherein the road condition indicates presence or absence of snow or ice and treatment material; determining a treatment recommendation based on the road condition and weather forecast; and conveying, for display on a display device, the treatment recommendation. In one instance, determining the treatment recommendation is based on available treatment material in view of forecasted material needed for remainder of a season. In another instance, determining the treatment recommendation is based on staff and equipment availability. In yet another instance, determining the treatment recommendation is based on driver alertness, hours of operation, route distance and repeat time. The method further comprises an operation that computes residual treatment material on a road as a function of type of treatment material, application time, and road grade, and determining the treatment recommendation based on the residual treatment material. In one instance, conveying, for display on the display device, the road condition overlaid on a map.

A method comprises executing, on a processor, instructions that cause the processor to perform operations comprising: receiving data from one or more sensors including at least one vehicle mounted sensor that monitors road surface temperature; determining a road condition based on the data from the one or more sensors, wherein the road condition indicates a level of snow or ice coverage and residual treatment material; determining a treatment recommendation based on the road condition, available treatment material and weather forecast; and conveying, for display on a display device, the treatment recommendation. The method of claim further comprises employing machine learning in determining a treatment recommendation continuous machine learning with respect to determining the treatment recommendation based on a comparison of post treatment results to expected results.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
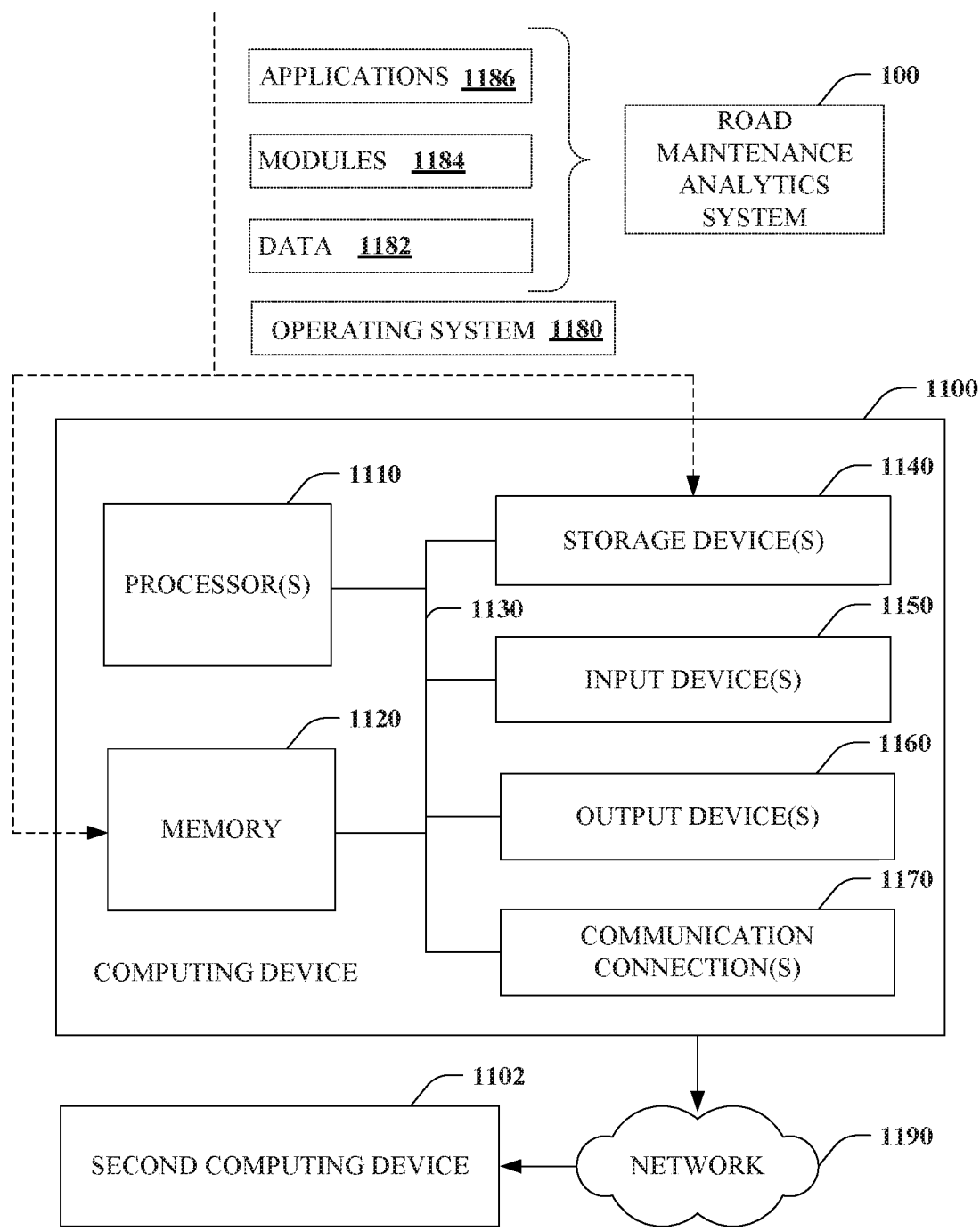
FIG. 11 is a schematic block diagram illustrating a suitable operating environment for aspects of the subject disclosure.

To provide a context for the disclosed subject matter, FIG. 11 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 11, illustrated is an example computing device 1100 (e.g., desktop, laptop, tablet, watch, server, hand-held, programmable consumer or industrial electronics, set-top box, game system, compute node . . . ). The computing device 1100 includes one or more processor(s) 1110, memory 1120, system bus 1130, storage device(s) 1140, input device(s) 1150, output device(s) 1160, and communications connection(s) 1170. The system bus 1130 communicatively couples at least the above system constituents. However, the computing device 1100, in its simplest form, can include one or more processors 1110 coupled to memory 1120, wherein the one or more processors 1110 execute various computer executable actions, instructions, and or components stored in the memory 1120.

The processor(s) 1110 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1110 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1110 can be a graphics processor unit (GPU) that performs calculations with respect to digital image processing and computer graphics.

The computing device 1100 can include or otherwise interact with a variety of computer-readable media to facilitate control of the computing device to implement one or more aspects of the disclosed subject matter. The computer-readable media can be any available media that accessible to the computing device 1100 and includes volatile and non-volatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1100. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1120 and storage device(s) 1140 are examples of computer-readable storage media. Depending on the configuration and type of computing device, the memory 1120 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1100, such as during start-up, can be stored in nonvolatile memory, while volatile memory can act as external cache memory to facilitate processing by the processor(s) 1110, among other things.

The storage device(s) 1140 include removable/non-removable, volatile/non-volatile storage media for storage of vast amounts of data relative to the memory 1120. For example, storage device(s) 1140 include, but are not limited to, one or more devices such as a magnetic or optical disk drive, floppy disk drive, flash memory, solid-state drive, or memory stick.

Memory 820 and storage device(s) 1140 can include, or have stored therein, operating system 1180, one or more applications 1186, one or more program modules 1184, and data 1182. The operating system 1180 acts to control and allocate resources of the computing device 1100. Applications 1186 include one or both of system and application software and can exploit management of resources by the operating system 1180 through program modules 1184 and data 1182 stored in the memory 1120 and/or storage device(s) 1140 to perform one or more actions. Accordingly, applications 1186 can turn a general-purpose computer 1100 into a specialized machine in accordance with the logic provided thereby.

All or portions of the disclosed subject matter can be implemented using standard programming and/or engineering techniques to produce software, firmware, hardware, or any combination thereof to control the computing device 1100 to realize the disclosed functionality. By way of example and not limitation, all or portions of the road maintenance analytics system 100 can be, or form part of, the application 1186, and include one or more modules 1184 and data 1182 stored in memory and/or storage device(s) 1140 whose functionality can be realized when executed by one or more processor(s) 1110.

In accordance with one particular embodiment, the processor(s) 1110 can correspond to a system on a chip (SOC) or like architecture including, or in other words integrating, both hardware and software on a single integrated circuit substrate. Here, the processor(s) 1110 can include one or more processors as well as memory at least similar to the processor(s) 1110 and memory 1120, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the road maintenance analytics system 100 and/or functionality associated therewith can be embedded within hardware in a SOC architecture.

The input device(s) 1150 and output device(s) 1160 can be communicatively coupled to the computing device 1100. By way of example, the input device(s) 1150 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1160, by way of example, can correspond to a display device (e.g., liquid crystal display (LCDP), light emitting diode (LED), plasma, organic light-emitting diode display (OLED) . . . ), speakers, voice user interface system, printer, and vibration motor, among other things. The input device(s) 1150 and output device(s) 1160 can be connected to the computing device 1100 by way of wired connection (e.g., bus), wireless connection (e.g., Wi-Fi, Bluetooth . . . ), or a combination thereof.

The computing device 1100 can also include communication connection(s) 1170 to enable communication with at least a second computing device 1102 by means of a network 1190. The communication connection(s) 1170 can include wired or wireless communication mechanisms to support network communication. The network 1190 can correspond to a local area network (LAN) or a wide area network (WAN) such as the Internet. The second computing device 1102 can be another processor-based device with which the computing device 1100 can interact. For instance, the computing device 1100 can correspond to a service center system and the second computing device 1102 can correspond to a service truck or driver device communicatively coupled to the service center.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

The invention claimed is:
1. A system, comprising:
a processor coupled to a memory that includes instructions that, when executed by the processor, cause the processor to:
determine a condition of a surface based on data received from one or more sensors, services, or human inputs;
invoke an artificial neural network trained to infer a treatment recommendation for a surface based on the condition and available treatment options, wherein the artificial neural network employs continuous learning to compute a treatment recommendation;

wherein the artificial neural network receives data including but not limited to weather, surface condition, treatment material, accident reports, or routes, wherein the artificial neural network learns to identify a treatment for a surface by way of supervised learning, unsupervised learning or reinforcement learning in conjunction with forward and backward propagation; and trigger generation of directions with a navigation device to a surface from a current location and directional heading in response to receipt of the treatment recommendation that identifies the surface, route, and treatment.

2. The system of claim 1, wherein the treatment recommendation is inferred based on residual treatment remaining on the surface.

3. The system of claim 1, further comprising instructions that cause the processor to compute residual treatment remaining on the surface based on type of treatment, time of treatment, weather, or traffic.

4. The system of claim 1, wherein the treatment recommendation is to plow the road.

5. The system of claim 1, wherein at least one of the one or more sensors is a vehicle mounted sensor that detects at least one of road surface temperature or road friction.

6. The system of claim 1, wherein at least one of the one or more sensors is a vehicle mounted sensor that detects road surface snow, ice, treatment chemical, or debris coverage.

7. The system of claim 1, further comprising instructions that cause the processor to convey, for display on a display device, the road condition overlaid on a map.

8. The system of claim 1, further comprising instructions that cause the processor to trigger performance by service equipment of the treatment recommendation.

9. The system of claim 1, further comprising instructions that cause the processor to receive driver input and output the treatment recommendation by way of a voice user interface.

10. A method, comprising:
generating a treatment control signal based on a treatment recommendation associated with a surface, wherein the treatment recommendation is an output of a first machine learning model trained that infers the treatment recommendation from features corresponding to at least one of surface condition, treatment material, or weather based on historical treatment data;
transmitting the treatment control signal to control engagement or disengagement of at least one of a treatment material spreader or a plow; and
generating directions with a navigation device to the surface from a current location or directional heading of the at least one of a treatment material spreader or a plow based on the treatment recommendation, wherein the at least one of a treatment material spreader or a plow is controlled according to the treatment signal while following the directions.

11. The method of claim 10, further comprising generating a treatment control signal for the treatment material spreader that controls a rate of disbursement of material based on the treatment recommendation.

12. The method of claim 10, further comprising adjusting a rate of disbursement in real-time based on residual material detected on a surface such that a total amount of treatment material corresponds to the treatment recommendation.

13. The method of claim 10, further comprising determining a current location that corresponds to the surface associated with the treatment recommendation; and generating directions from the current location to the surface.

* * * * *